United States Patent
Sakai et al.

(10) Patent No.: US 8,215,214 B2
(45) Date of Patent: Jul. 10, 2012

(54) WORKPIECE GRIPPING METHOD AND WORKPIECE CENTERING APPARATUS

(75) Inventors: Shigetsugu Sakai, Yamatokoriyama (JP); Masahiro Yamane, Yamatokoriyama (JP); Toshio Ueda, Yamatokoriyama (JP); Satoshi Nozaki, Yamatokoriyama (JP)

(73) Assignee: Mori Seiki Co., Ltd., Yamatokoriyama-Shi, Nara (JP)

( * ) Notice: Subject to any disclaimer, the term of this patent is extended or adjusted under 35 U.S.C. 154(b) by 218 days.

(21) Appl. No.: 12/752,866

(22) Filed: Apr. 1, 2010

(65) Prior Publication Data

US 2010/0251863 A1    Oct. 7, 2010

(30) Foreign Application Priority Data

Apr. 3, 2009 (JP) ................................ 2009-090723

(51) Int. Cl.
 *B23B 13/12* (2006.01)
 *B23Q 3/06* (2006.01)
(52) U.S. Cl. .......................................... 82/164; 82/170
(58) Field of Classification Search .................. 82/150, 82/151, 157, 162, 164, 170; 409/197, 219
See application file for complete search history.

(56) References Cited

U.S. PATENT DOCUMENTS

| | | | | | |
|---|---|---|---|---|---|
| 4,517,866 | A | * | 5/1985 | Bazuin | 82/164 |
| 4,631,995 | A | * | 12/1986 | Vroenen | 82/164 |
| 4,838,135 | A | * | 6/1989 | Hevoyan | 82/124 |
| 5,014,580 | A | * | 5/1991 | Porter | 82/164 |
| 5,222,421 | A | * | 6/1993 | Ushiro | 82/164 |
| 5,277,090 | A | * | 1/1994 | Shintani et al. | 82/112 |
| 5,525,017 | A | * | 6/1996 | Asada | 409/197 |
| 6,575,063 | B1 | * | 6/2003 | Inaba | 82/127 |
| 7,509,898 | B2 | * | 3/2009 | Tanaka et al. | 82/164 |
| 2008/0178719 | A1 | * | 7/2008 | Tanaka et al. | 82/148 |

FOREIGN PATENT DOCUMENTS

JP    2002-059301    2/2002

* cited by examiner

*Primary Examiner* — Will Fridie, Jr.
(74) *Attorney, Agent, or Firm* — WPAT, P.C.; Anthony King

(57) ABSTRACT

A workpiece centering apparatus 1 is provided on a lathe having a spindle 33, an independent chuck 34, and upper and lower tool rests 37, 41, and has sandwiching members 11, 12 mounted to the tool rests 37, 41, respectively, and capable of contacting the outer peripheral surface of a workpiece W, and a centering control section 15 for moving the tool rests 37, 41 and thereby moving the sandwiching members 11, 12 to their respective centering positions which are the positions of the sandwiching members 11, 12 when the center position of a portion to be machined of the workpiece W coincides with the axis of the spindle 33 in a state where the portion to be machined of the workpiece W is being sandwiched and held by the sandwiching members 11, 12, and then causing the independent chuck 34 to grip the workpiece W.

4 Claims, 7 Drawing Sheets

WORKPIECE GRIPPING METHOD AND WORKPIECE CENTERING APPARATUS

TECHNICAL FIELD

The present invention relates to a gripping method of gripping a workpiece by means of an independent chuck attached to a spindle in a lathe and a centering apparatus for centering a workpiece gripped by the independent chuck attached to the spindle.

BACKGROUND ART

A lathe is usually provided with a bed, a headstock, a spindle, a tool rest etc. as main components, and as such a lathe, there has conventionally been, for example, a lathe as disclosed in Japanese Unexamined Patent Application Publication No. 2002-59301.

That is, this lathe is provided with a bed, a first headstock disposed on the bed, a first spindle supported by the first headstock so that it is rotatable about its axis and that its axis is horizontal, a first chuck attached to the tip of the first spindle for gripping a workpiece, a second headstock disposed on the bed so that it faces the first headstock and that it is movable in a first direction parallel to the axis of the first spindle, a second spindle supported by the second headstock so that it is coaxial with the first spindle and is rotatable about its axis, a second chuck attached to the tip of the second spindle for gripping a workpiece, a first tool rest which is disposed on the bed so that it is movable in the first direction and in a second direction perpendicular thereto and to which tools are mounted, a second tool rest which is disposed on the bed between the first headstock and the second headstock so that it is movable in the first and second directions and to which tools are mounted, a rotation drive mechanism for rotating the first spindle about its axis, a first feed mechanism for moving the second headstock, a second feed mechanism for moving the first tool rest, a third feed mechanism for moving the second tool rest, and other components.

In this lathe, for example, both ends of a workpiece are gripped by the chucks or one end of a workpiece is gripped by the first chuck, and the workpiece gripped in this way is machined by tools mounted to the first tool rest and the second tool rest.

SUMMARY OF INVENTION

Technical Problem

When machining the tip portion of a solid workpiece or the tip portion of a hollow cylindrical workpiece whose inner diameter is not so large, generally, a tailstock is provided in place of the second headstock on the above-mentioned lathe; a middle portion of the workpiece or the end portion opposite to the tip portion to be machined of the workpiece is gripped by the first chuck (scroll chuck); the tip portion is supported by a tailstock spindle of the tailstock; and the workpiece is machined.

The reason for this is that, although as shown in FIG. 12, the axis of a workpiece W is not always straight and is sometimes curved (see the long dashed double-short dashed line) because of a problem of accuracy in manufacturing workpieces etc., supporting a workpiece W by means of the tailstock spindle makes it possible that even a workpiece W having a curved axis can be supported with its axis straight.

On the other hand, when machining the tip portion of a hollow cylindrical workpiece having a large outer diameter and a large inner diameter, it is necessary to machine the workpiece without supporting the tip portion thereof because it is impossible to support the tip portion by means of the tailstock spindle. As an example of such a workpiece, for example, a flow pipe in which a fluid flows can be provided. Such a flow pipe is, for example, as shown in FIG. 12, to be machined (thread cutting) only at the outer peripheral surfaces Wa of both ends thereof, and two flow pipes are connected by a joint engaged with the thread groove.

However, when a workpiece W having a curved axis as shown by long dashed double-short dashed line in FIG. 12 is gripped by the first chuck (scroll chuck), the center position of the tip portion of the workpiece W and the axis of the first spindle are misaligned, and therefore, it is not possible to machine the tip portion of the workpiece W into a predetermined shape. In the example shown in FIG. 12, even though the workpiece W is machined, a predetermined thread groove cannot be formed.

The present invention has been achieved in view of the above-described circumstances, and an object of the present invention is to provide a workpiece gripping method and workpiece centering apparatus capable of machining a portion to be machined of a cylindrical workpiece into a predetermined shape even when the axis of the workpiece has a curved axis.

Solution to Problem

The present invention, for achieving the above-described object, relates to a workpiece gripping method for, in a lathe having at least a spindle and tool rests, gripping a cylindrical workpiece by means of an independent chuck attached to an end face of the spindle, the tool rests being disposed on both sides of the axis of the spindle with the axis of the spindle between them in a plane orthogonal to the axis of the spindle and being provided so that it is movable in a direction parallel to the spindle axis and in a direction orthogonal thereto, the workpiece gripping method characterized in that:

first, a sandwiching member for centering is mounted to each tool rest to face the spindle axis side;

then the tool rests are moved so that the sandwiching members and a workpiece loaded into a gripping position at which the workpiece is to be gripped by the independent chuck are brought into a positional relationship that a portion to be machined of the workpiece is positioned between the sandwiching members and the sandwiching members face each other;

subsequently, by moving the tool rests in turn or simultaneously, the sandwiching members are moved to their respective centering positions and the portion to be machined of the workpiece is sandwiched and held by the two sandwiching members, the centering position being the position of the sandwiching member when the center position of the portion to be machined of the workpiece coincides with the spindle axis in a state where the portion to be machined of the workpiece is being sandwiched and held by the two sandwiching members; and thereafter the workpiece is gripped by the independent chuck.

This workpiece gripping method is preferably performed by the following workpiece centering apparatus. That is, this workpiece centering apparatus is provided on a lathe having a spindle arranged horizontally, an independent chuck attached to an end face of the spindle for gripping a cylindrical workpiece, a loading mechanism for loading the workpiece into a gripping position at which the workpiece is to be gripped by the independent chuck, tool rests being disposed on both sides of the spindle axis with the spindle axis between them in a plane orthogonal to the spindle axis and being provided so that they are movable in a direction parallel to the spindle axis and in a direction orthogonal thereto, and feed mechanisms for moving the respective tool rests, and, when a workpiece loaded into the gripping position is gripped by the independent chuck, centers a portion to be machined of the workpiece, and the workpiece centering apparatus is configured to comprise:

sandwiching members which are mounted to the respective tool rests to face toward the spindle axis side and capable of contacting the outer peripheral surface of the workpiece, and which, when contacting the workpiece, position the center positions of their respective contact portions on a straight line parallel to the orthogonal direction and passing through the spindle axis; and control means for controlling operations of the independent chuck and feed mechanisms, the control means for moving the tool rests so that the sandwiching members and the workpiece loaded into the gripping position by the loading mechanism are brought into a positional relationship that the portion to be machined of the workpiece is positioned between the sandwiching members and the sandwiching members face each other, then moving the tool rests in turn or simultaneously, thereby moving the sandwiching members to their respective centering positions and causing the two sandwiching members to sandwich and hold the portion to be machined of the workpiece, the centering position being the position of the sandwiching member when the center position of the portion to be machined of the workpiece coincides with the spindle axis in a state where the portion to be machined of the workpiece is being sandwiched and held by the two sandwiching members, and thereafter, causing the independent chuck to grip the workpiece.

In this centering apparatus, before a workpiece which is loaded into the gripping position by the loading mechanism is gripped by the independent chuck, the workpiece is centered in the following manner.

That is, first, the feed mechanisms are driven by the control means and the tool rests are thereby moved. Specifically, the tool rests are moved so that the sandwiching members and the workpiece which is loaded into the gripping position by the loading mechanism are brought into a positional relationship that a portion to be machined of the workpiece is positioned between the sandwiching members and the sandwiching members face each other, and subsequently the tool rests are moved in turn or simultaneously to move the sandwiching members to their respective centering positions.

Thereby, the portion to be machined of the workpiece is sandwiched and held by the sandwiching members, and the center position of the portion to be machined of the workpiece coincides with the spindle axis even when the workpiece has a curved axis as well as when the workpiece has a straight axis. It is noted that the centering position is the position of the sandwiching member when the center position of the portion to be machined of the workpiece coincides with the spindle axis in a state where the portion to be machined of the workpiece is being sandwiched and held by the two sandwiching members. The centering position of each sandwiching member can be set, for example, by measuring the position of each sandwiching member in a state where a portion to be machined of a reference workpiece is actually being sandwiched and held by the sandwiching members.

Thereafter, the independent chuck is driven by the control means and the workpiece is gripped. At this time, because gripping jaws of the independent chuck individually moves, the workpiece is gripped without the center position of the portion to be machined of the workpiece being misaligned even when the workpiece has a curved axis and the center position of the portion to be gripped of by the gripping jaws of the workpiece and the spindle axis are thereby misaligned.

After the workpiece is centered in this way, for example, the feed mechanisms are driven by the control means and the tool rests are thereby moved so as to be separated from each other, and thereafter the portion to be machined of the workpiece is machined by a tool or tools mounted to one or both of the tool rests.

Thus, according to the workpiece gripping method and workpiece centering apparatus of the present invention, it is possible to center not the portion to be gripped by the independent chuck of the workpiece but the portion to be machined of the workpiece. Therefore, it is possible to surely machine the portion to be machined of the workpiece into a predetermined shape.

Further, since it is sufficient only to provide a sandwiching member for each tool rest and move the tool rests, the centering can be easily performed at a low cost.

The centering apparatus may be configured so that: it further comprises detection means for detecting that the portion to be machined of the workpiece is sandwiched and held by the sandwiching members; and the control means, in causing the sandwiching members to sandwich and hold the portion to be machined of the workpiece, moves the sandwiching members which are positioned the same distance away from their respective centering positions by at the same feed rate until the detection means detects that the portion to be machined of the workpiece is sandwiched and held.

Usually, workpieces vary in outer diameter and the degree of axial curvature. Therefore, when the sandwiching members are simply moved to the centering members, there may be a case where the portion to be machined of the workpiece is not sandwiched and held by the sandwiching members when the sandwiching members reach their respective centering positions or, in contrast, a case where the portion to be machined of the workpiece is sandwiched and held by the sandwiching members before the sandwiching members reach their respective centering positions. In such cases, the workpiece cannot be centered accurately.

Therefore, when configured as described above, it is possible to, even when workpieces vary, center a portion to be machined of a workpiece so that the center position of the portion to be machined of the workpiece surely coincides with the spindle axis.

Further, the control means may be configured as described below instead of the configuration as described above. That is, the control means may be configured to, in causing the sandwiching members to sandwich and hold the portion to be machined of the workpiece, check, when the detection means detects that the portion to be machined of the workpiece is sandwiched and held by the sandwiching members, whether the actual positions of the sandwiching members correspond to the centering positions thereof. In the case where the actual positions do not coincide with the centering positions, the control means calculates, on the basis of the actual positions and centering positions thereof, the position of each sandwiching member for causing the center position of the portion to be machined of the workpiece to coincide with the spindle axis, and moves the sandwiching members to the calculated positions.

Also when configured in this way, similarly to the above, it is possible to, even when workpieces vary, center a portion to be machined of a workpiece so that the center position of the portion to be machined of the workpiece surely coincides with the spindle axis.

As the detection means, for example, a pressure sensor, a proximity sensor, a touch sensor or the like which is capable of detecting contact between the sandwiching members and the outer peripheral surface of the workpiece can be employed. Alternatively, because a load applied to a drive motor which is a component of the feed mechanism is increased and a current supplied to the drive motor is increased when the portion to be machined of the workpiece is sandwiched and held by the sandwiching members and the movements of the tool rests are stopped, the detection means may be configured to detect the current supplied to one or both of the drive motors corresponding to the tool rests, and, when the detected value exceeds a predetermined value, determine that the portion to be machined of the workpiece is sandwiched and held by the sandwiching members. Alternatively, because the moving position of the one tool rest and the moving position of the other tool rest are shifted in directions away from each other by a drive force of the feed mechanism driving the other tool rest and a drive force of the feed mechanism driving the one tool rest, respectively when the portion to be machined of the workpiece is sandwiched and held by the sandwiching members, the detection means may be configured to detect position shifts of one or both of the tool rests and thereby determine that the portion to be machined of the workpiece is sandwiched and held by the sandwiching members.

Advantageous Effects of Invention

Thus, according to the workpiece gripping method and workpiece centering apparatus of the present invention, since it is possible to center a portion to be machined of a workpiece instead of a portion to be gripped by an independent chuck of the workpiece, the portion to be machined of the workpiece can be surely machined into a predetermined shape.

DESCRIPTION OF EMBODIMENTS

Figure 1:
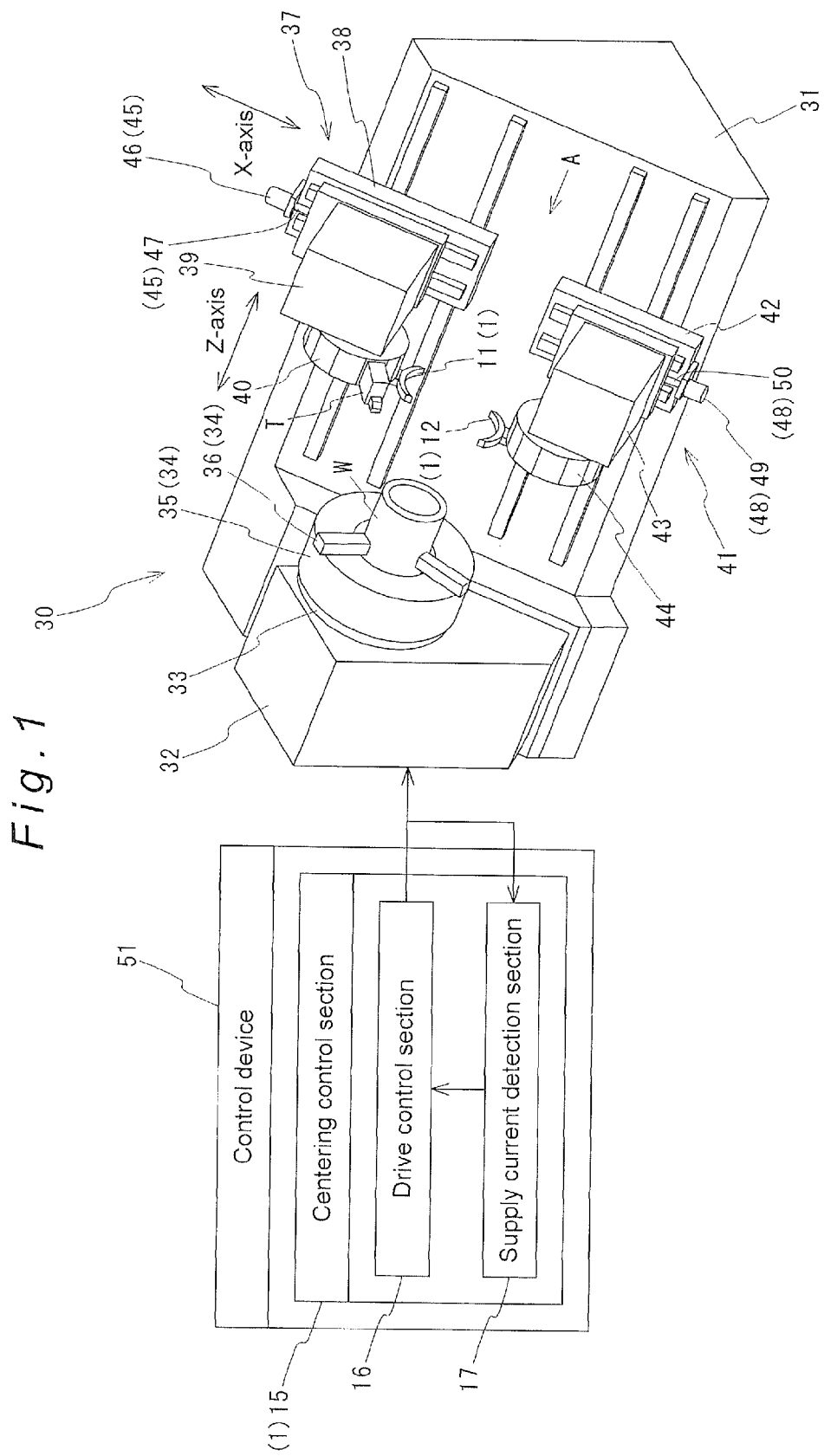
FIG. 1 is a perspective view showing a schematic configuration of a workpiece centering apparatus and other components according to one embodiment of the present invention.
Figure 2:
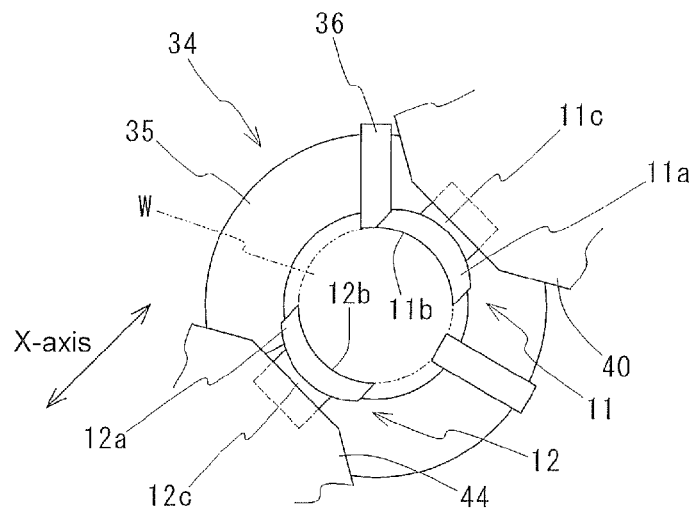
FIG. 2 is a side view taken in the direction of arrow A in FIG. 1.

Hereinafter, a specific embodiment of the present invention will be explained with reference to the accompanying drawings. FIG. 1 is a perspective view showing a schematic configuration of a workpiece centering apparatus and other components according to one embodiment of the present invention, and FIG. 2 is a side view taken in the direction of arrow A in FIG. 1.

As shown in FIG. 1, a workpiece centering apparatus 1 of the embodiment is provided on, for example, a lathe 30 as shown and centers a hollow cylindrical workpiece W to be machined in the lathe 30. The workpiece centering apparatus 1 has sandwiching members 11, 12 (upper sandwiching member 11 and lower sandwiching member 12) which are mounted to turrets 40, 44 of the lathe 30, respectively, and a centering control section 15 for controlling the positions of the sandwiching members 11, 12 at the time of centering the workpiece W. It is noted that, in the subsequent explanation, it is supposed that the workpiece W has a portion to be machined on the outer peripheral surface of one end thereof.

First, the lathe 30 is explained. The lathe 30 is configured to have: a bed 31 the front face of which is tilted backward; a headstock 32 fixed on the front face of the bed 31; a spindle 33 formed in a hollow cylindrical shape and supported by the headstock 32 so that it is rotatable about its axis and that its axis is horizontal; an independent chuck 34 attached to the tip of the spindle 33 for gripping the workpiece W; a rotation drive mechanism (not shown) for rotating the spindle 33 about its axis; an upper tool rest 37 disposed on the front face of the bed 31 so that it is movable in a Z-axis direction parallel to the axis of the spindle 33 and in an X-axis direction perpendicular thereto and parallel to the tilted front face of the bed 31 for holding a tool T; a lower tool rest 41 disposed on the front face of the bed 31 so that it is movable in the Z-axis direction and in the X-axis direction for holding a tool (not shown); a first feed mechanism 45 for driving and moving the upper tool rest 37 in said directions; and a second feed mechanism 48 for driving and moving the lower tool rest 41 in said directions; and a control device 51 for controlling operations of the independent chuck 34, rotation drive mechanism (not shown), feed mechanisms 45, 48 and other components.

The independent chuck 34 is configured with a ring-shaped chuck body 35 provided on the tip of the spindle 33 coaxially therewith, a plurality of gripping jaws 36 provided radially on one end face of the chuck body 35 so that they are movable in the radial direction, and a gripping-jaw drive mechanism (not shown) for individually driving and moving the gripping jaws 36. The outer peripheral surface of the workpiece W is gripped by the gripping jaws 36.

The upper tool rest 37 is arranged so that it approaches the axis of the spindle 33 from above and is separated upward from the axis of the spindle 33. The upper tool rest 37 is configured with a saddle 38 disposed on the front face of the bed 31 so that it is movable in the Z-axis direction, a tool rest body 39 disposed on the top surface of the saddle 38 so that it is movable in the X-axis direction, the turret 40 which has a polygonal prism shape and is supported by the tool rest body 39 so that it is rotatable about a rotation center axis parallel to the Z axis and to the outer peripheral surface of which a plurality of tools T are mounted (in FIG. 1, only one tool is shown and others are omitted), and an index drive mechanism (not shown) for rotating the turret 40 about the rotation center axis for indexing.

The lower tool rest 41 is arranged so that it approaches the axis of the spindle 33 from below and is separated downward from the axis of the spindle 33, and has the same configuration as that of the upper tool rest 37. That is, the lower tool rest 41 is configured with a saddle 42, a tool rest body 43, the turret 44, and an index drive mechanism (not shown).

The first feed mechanism 45 is configured with a drive motor, a ball screw, a nut and other components, and moves the tool rest body 39 (upper tool rest 37) in the X-axis direction by rotating a ball screw 47 by means of a drive motor 46 fixed on the upper portion of the saddle 38.

The second feed mechanism 48 is, similarly to the first feed mechanism 45, configured with a drive motor, a ball screw, a nut and other components, and moves the tool rest body 43 (upper tool rest 41) in the X-axis direction by rotating a ball screw 50 by means of a drive motor 49 fixed on the lower portion of the saddle 42.

Figure 4:
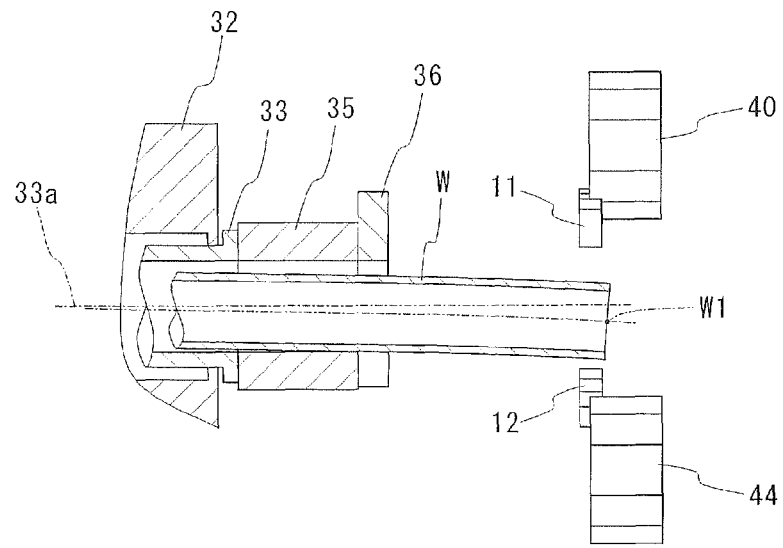
FIG. 4 is an illustration for explaining the procedures for centering a workpiece according to the embodiment.

The workpiece W is fed, for example, by a not-shown workpiece loading device, from the rear end side of the spindle 33 through the hollow portions of the spindle 33 and chuck body 35, and one end thereof protrudes from one end face of the tool rest body 35. Thereby, the workpiece W is loaded into a gripping position at which the workpiece W is to be gripped by the independent chuck 34 (see FIG. 4). The workpiece W fed in this way is gripped by the independent chuck 34, and the one end thereof is machined. The other end of the workpiece W is supported, for example, by a not-shown support device, so that it is rotatable about its axis and that the center position of the other end portion coincides with the axis of the spindle 33. A mode of supporting the other end of the workpiece W is not limited, and a mode where the other end of the workpiece W is not particularly supported may be employed.

Next, the workpiece centering apparatus 1 is explained. The workpiece centering apparatus 1, as described above, has the upper sandwiching member 11, the lower sandwiching member 12 and the centering control section 15, and the centering control section 15 is provided in the control device 51. The workpiece centering apparatus 1 is configured to center the one end of the workpiece W which is loaded as described above.

As shown FIGS. 1 and 2, the upper sandwiching member 11 and the lower sandwiching member 12 are mounted to the turret 40 of the upper tool rest 37 and the turret 44 of the lower tool rest 41, respectively, and they are mounted to face toward the axis of the spindle 33. The sandwiching members 11, 12 have the same shape, and are configured with contact portions 11a, 12a with concave surfaces 11b, 12b capable of contacting the outer peripheral surface of the workpiece W, and mounting portions 11c, 12c mounted to the turret 40, 44, respectively.

The concave surfaces 11b, 12b are formed to be capable of, when contacting the outer peripheral surface of the workpiece W, positioning the center positions of the workpiece W in their respective contacting portions, the center positions of the workpiece W in their respective contacting portions are positioned on a straight line parallel to the X-axis direction and passing through the axis of the spindle 33. Therefore, when centering the workpiece W, it is sufficient to adjust the positions of the sandwiching members 11, 12 in the X-axis direction by moving the tool rests 37, 41 only in the X-axis direction.

The centering control section 15 is configured to center the workpiece W in accordance with a centering control program generated in advance, and has, as shown in FIG. 1, a drive control section 16 and a supply current detection section 17. The drive control section 16 controls operations of the feed mechanisms 45, 48 and gripping-jaw drive mechanism (not shown). With reference to the feed mechanisms 45, 48, the drive control section 16 drives the corresponding drive motors by supplying a current to them, thereby moving the tool rests 37, 41. When receiving a stop signal from the supply current detection section 17, the drive control section 16 stops supplying a current to the drive motors, thereby stopping the movements of the tool rests 37, 41. The supply current detection section 17 detects the current supplied to the drive motor 49 of the second feed mechanism 48 from the drive control section 16, and transmits a stop signal to the drive control section 16 when the detected value exceeds a predetermined value.

Figure 3:
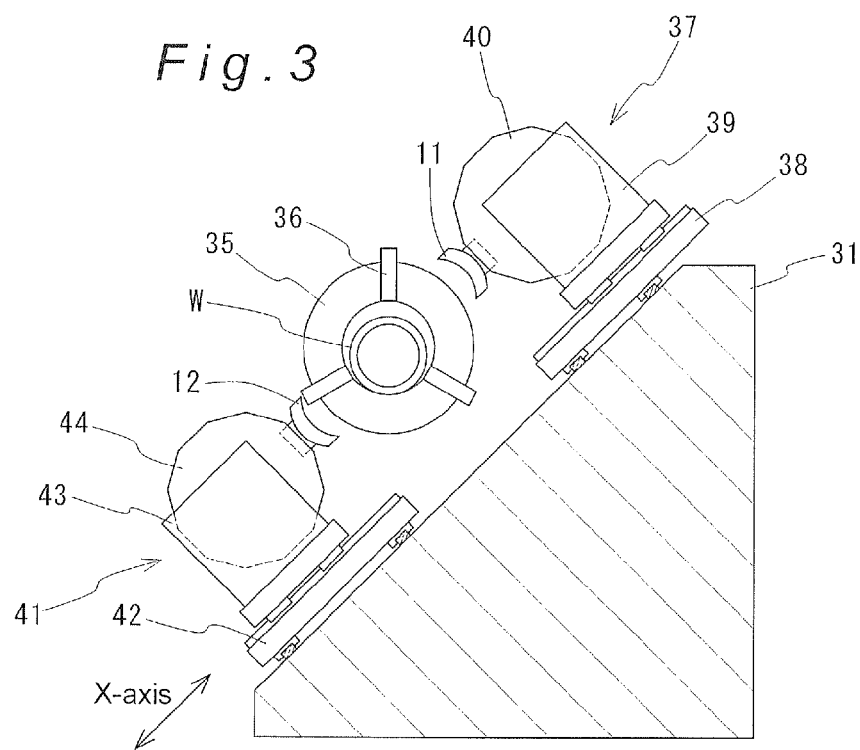
FIG. 3 is an illustration for explaining procedures for centering a workpiece according to the embodiment.

The drive control section 16 and the supply current detection section 17 center the one end of the workpiece W, which is the portion to be machined, in the following manner. That is, first, the feed mechanisms 45, 48 are driven and the saddles 38, 42 (tool rests 37, 41) are thereby moved to their respective predetermined moving positions in the Z-axis direction, and the one end of the workpiece W loaded into the gripping position is positioned between the first sandwiching member 11 and the second sandwiching member 12 and simultaneously the sandwiching members 11, 12 are opposed to each other (see FIGS. 3 and 4). It is noted that, although the one end of the workpiece W is curved downward in the embodiment shown in FIGS. 3 and 4, it is possible to apply the centering apparatus 1 of the present embodiment in a case where the one end of the workpiece W is curved upward, to the right or to the left. The independent chuck 34 is shown in a state where the inner configuration thereof and the like are omitted.

Next, the feed mechanisms 45, 48 are driven and the tool rest bodies 39, 43 (tool rests 37, 41) are thereby moved in the X-axis direction so as to approach each other, thereby sandwiching and holding the one end of the workpiece W from both sides by means of the sandwiching members 11, 12. At this time, first, the tool rests 37, 41 are moved to their respective moving positions, which are the same distance short of their respective predetermined centering positions, and are caused to approach each other, and subsequently the tool rests 37, 41 are moved at the same feed rate until a stop signal from the supply current detection section 17 is received. When the stop signal is received, the movements of the tool rests 37, 41 are stopped.

The centering positions are the positions of the tool rests 37, 41 (sandwiching members 11, 12) when the center position of the one end of the workpiece W coincides with the axis of the spindle 33 in a state where the one end of the workpiece W is being sandwiched and held by the sandwiching members 11, 12. The centering positions can be preset, for example, by means of a master workpiece. Specifically, the centering positions can be set by measuring the moving position of each tool rest 37, 41 in a state where one end of a master workpiece is actually being sandwiched and held by the sandwiching members 11, 12.

The reason that the tool rests 37, 41 are moved until a stop signal from the supply current detection section 17 is received is that the determination that the workpiece W is sandwiched and held by the sandwiching members 11, 12 can be made when a stop signal is transmitted. That is, because, when the workpiece W is sandwiched and held by the sandwiching members 11, 12 and the movements of the tool rests 37, 41 are thereby stopped, the loads applied to the drive motors 46, 49 of the feed mechanisms 45, 48 are increased and the currents supplied to the drive motors 46, 49 are thereby increased, the determination that the workpiece W is sandwiched and held can be made when the currents supplied to the drive motors 46, 49 exceed a predetermined reference value.

In the embodiment, a determination whether the workpiece W is sandwiched and held is made on the basis of the current supplied to the drive motor 49. The reason for this is that, since the second feed mechanism 48 moves the tool rest body 43 obliquely upward while the first feed mechanism 45 moves the tool rest body 39 obliquely downward, the load applied when the workpiece W is sandwiched and held is larger in the drive motor 49 of the second feed mechanism 48 than in the drive motor 46 of the first feed mechanism 45. That is, the amount of variation of the current when the workpiece W is sandwiched and held is larger in the drive motor 49 than in the drive motor 46, and therefore, it is possible to more surely detect that the workpiece W is sandwiched and held.

Figure 5:
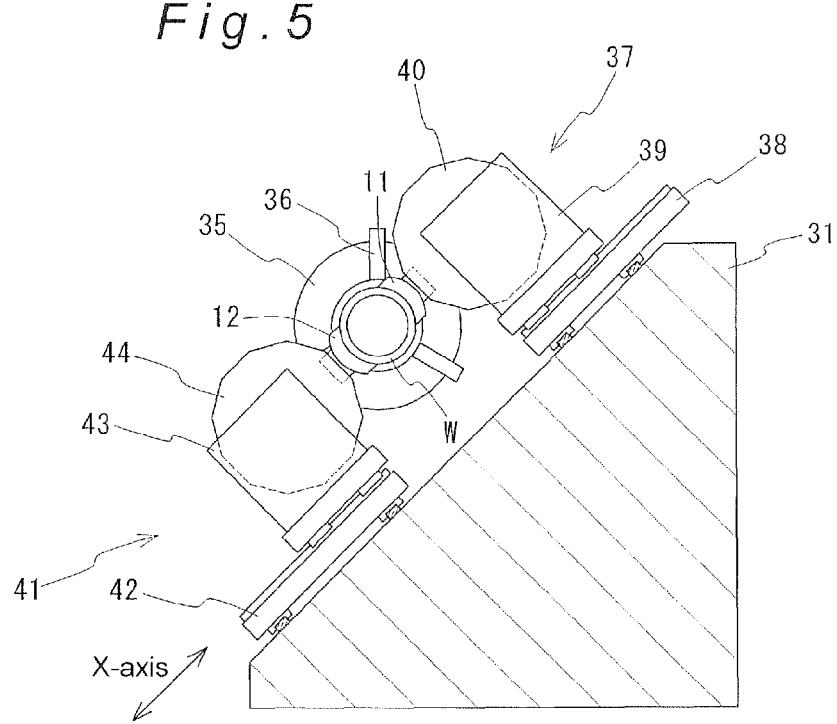
FIG. 5 is an illustration for explaining the procedures for centering a workpiece according to the embodiment.
Figure 6:
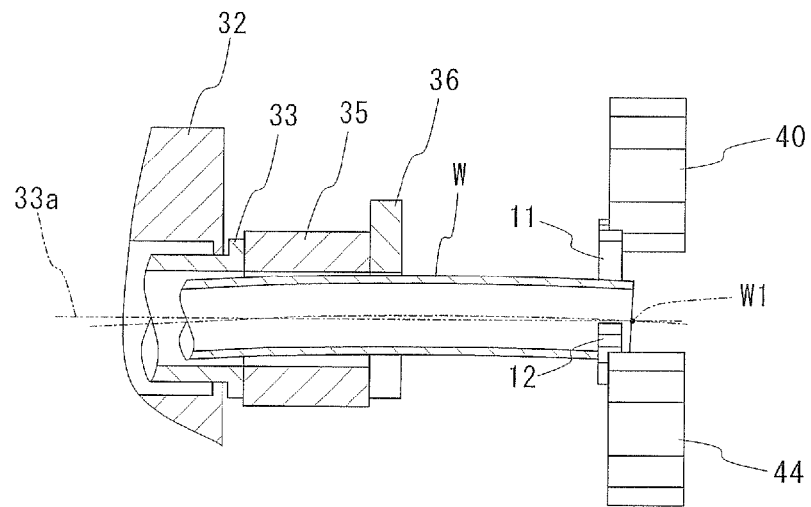
FIG. 6 is an illustration for explaining the procedures for centering a workpiece according to the embodiment.

When the one end of the workpiece W is sandwiched and held from both sides by the sandwiching members 11, 12, the center position W1 of the one end of the workpiece W coincides with the axis 33a of the spindle 33 (see FIGS. 5 and 6). Thereby, the center position W1 of at the one end of the workpiece W coincides with the axis of the spindle 33 even in the case where the axis of the workpiece W is curved as well as in the case where the axis of the workpiece W is straight.

Figure 7:
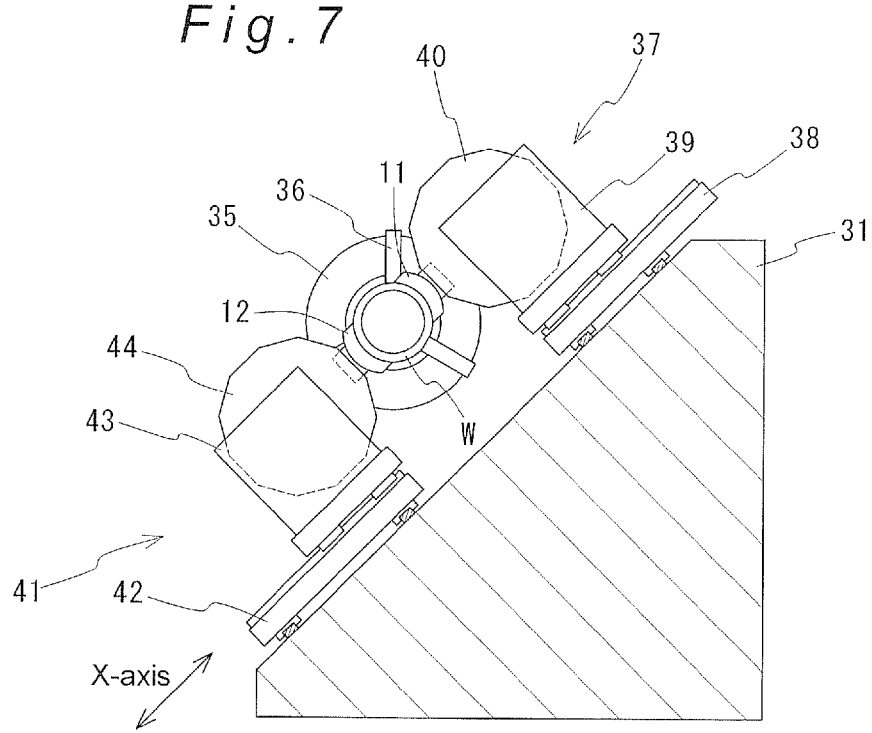
FIG. 7 is an illustration for explaining the procedures for centering a workpiece according to the embodiment.
Figure 8:
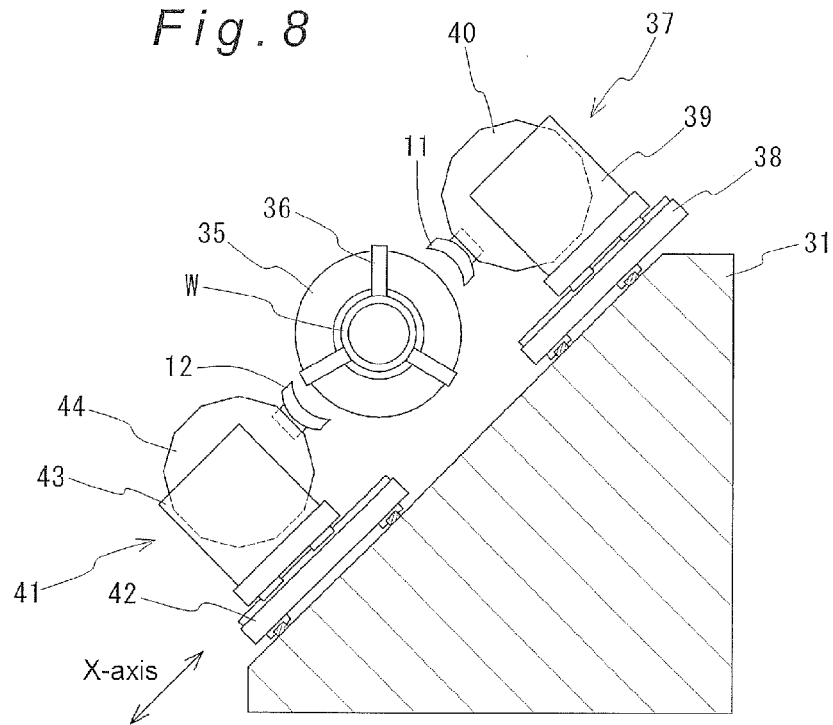
FIG. 8 is an illustration for explaining the procedures for centering a workpiece according to the embodiment.

Thereafter, the gripping jaws 36 are driven by the gripping-jaw drive mechanism (not shown) and are thereby caused to hold the workpiece W (see FIG. 7). At this time, because the gripping jaws 36 individually moves, the workpiece W is gripped by the gripping jaws 36 without the center position of the one end of the workpiece W being misaligned even when the center position of the workpiece W and the axis of the spindle 33 are misaligned at the portion to be gripped by the gripping jaws 36 of the workpiece W. Then, the feed mechanisms 45, 48 are driven and the tool rests 37, 41 are thereby moved in the X-axis direction so as to be separated from each other (see FIG. 8).

As described specifically above, according to the centering apparatus 1 of the present embodiment, it is possible to center the one end of the workpiece W, which is the portion to be machined, instead of the portion to be gripped by the chuck 34. Therefore, it is possible to surely machine the one end of the workpiece W into a predetermined shape.

Further, since it is sufficient only to provide the sandwiching members 11, 12 for the upper tool rest 37 and the lower tool rest 41, respectively, and move the upper tool rest 37 and the lower tool rest 41, the centering can be easily performed at a low cost.

Furthermore, workpieces W usually vary in outer diameter and the degree of axial curvature. However, in the present embodiment, since it is configured so that the tool rests 37, 41 are moved at the same feed rate until a stop signal from the supply current detection section 17 is received after the tool rests 37, 41 are moved to their respective moving positions, which are the same distance short of their respective centering positions, and are caused to approach each other, it is possible to surely cause the center position of the one end of the workpiece W to coincide with the axis of the spindle 33 even when workpieces W vary, and therefore, it is possible to center the one end of the workpiece W with high accuracy.

Thus, one embodiment of the present invention has been explained. However, a specific mode in which the present invention can be realized is not limited thereto.

For example, the drive control section 16 may control the feed mechanisms 45, 48 in the following manner when moving the tool rests 37, 41 in the X-axis direction so as to approach each other and thereby causing the sandwiching members 11, 12 to sandwich and hold the one end of the workpiece W.

Figure 9:
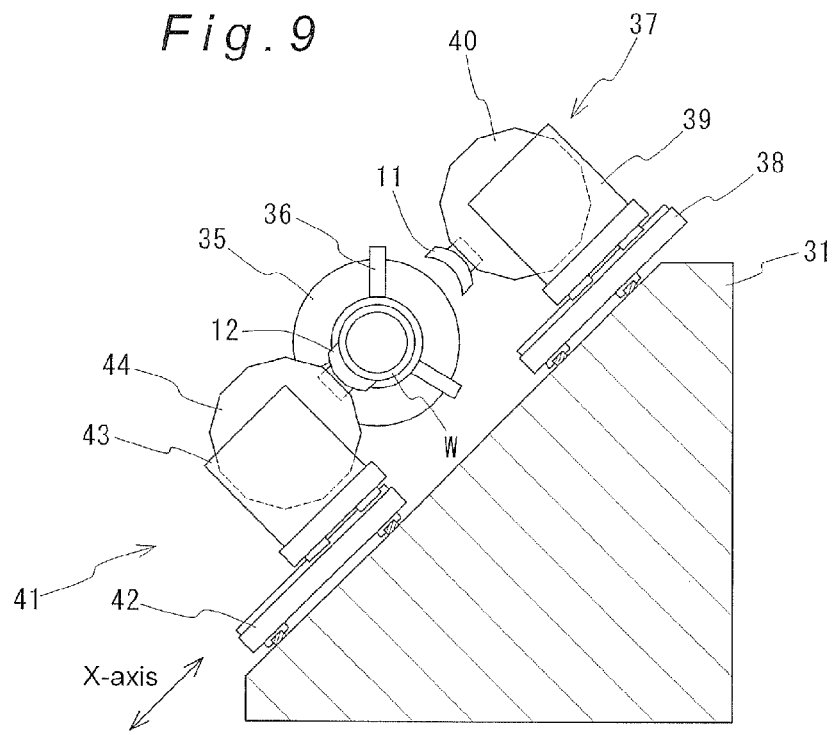
FIG. 9 is an illustration for explaining procedures for centering a workpiece according to an alternative embodiment of the present invention.
Figure 10:
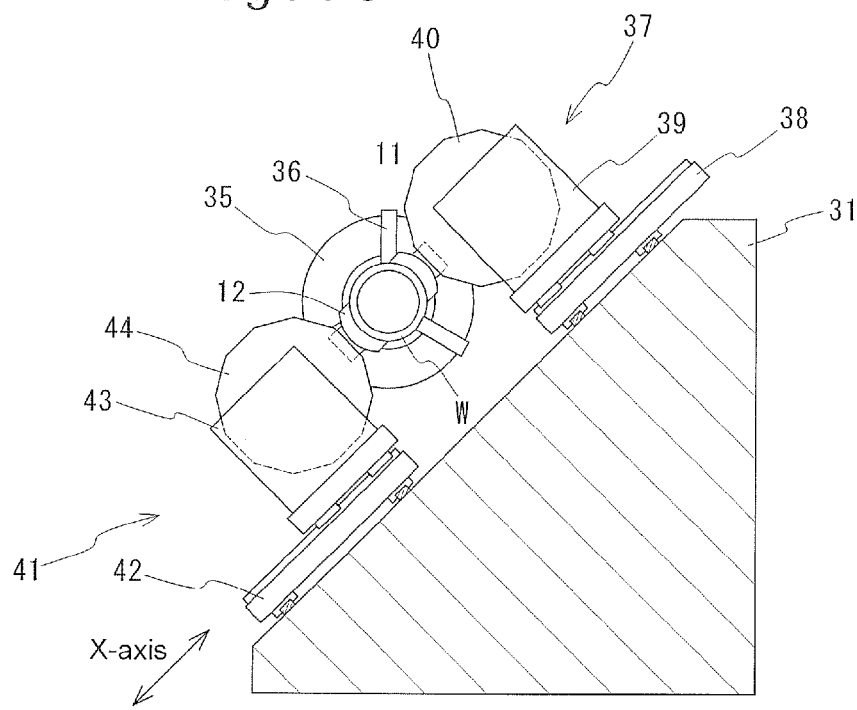
FIG. 10 is an illustration for explaining the procedures for centering a workpiece according to the alternative embodiment of the present invention.

That is, first, as shown in FIG. 9, the tool rest 41 is moved by the second feed mechanism 48 in the X-axis direction to the centering position thereof, and then, as shown in FIG. 10, the upper tool rest 37 is moved by the first feed mechanism 45 toward the lower tool rest 41 side until a stop signal from the supply current detection section 17 is received.

When the stop signal is received, that is, when the one end of the workpiece W is sandwiched and held by the sandwiching members 11, 12, the movement of the tool rest 37 is stopped, and then a check is made whether the actual moving positions of the tool rests 37, 41 at this time correspond to their respective centering positions. When they do not correspond to their respective centering positions, a moving position of each of the tool rests 37, 41 for causing the center position of the one end of the workpiece W to coincide with the axis of the spindle 33 is calculated on the basis of the actual moving positions and centering positions thereof, and the tool rests 37, 41 are moved to the calculated moving positions.

For example, when assuming that the centering positions of the tool rests 37, 41 in the X-axis direction are 20 and 60, respectively, and the actual moving positions of the tool rests 37, 41 in the X-axis direction are 18, 60, the tool rests 37, 41 are moved to moving positions of 19, 61, respectively. Thereby, the center position of the one end of the workpiece W coincides with the axis of the spindle 33. It is noted that, with reference to the coordinate axis, the obliquely downward direction of the X-axis is taken as a positive direction.

Also in this case, similarly to the above, it is possible to center the one end of the workpiece W with high accuracy even when workpieces W vary in outer diameter the degree of axial curvature. It is noted that, it may be configured so that, in reverse to the above, first the upper tool rest 37 is moved in the X-axis direction to the centering position, and then the lower tool rest 41 is moved toward the upper tool rest 37 side.

In determining that the workpiece W is sandwiched and held by the sandwiching members 11, 12, the determination may be made by means of a sensor, such as a pressure sensor, a proximity sensor, a touch sensor or the like, which is capable of detecting contact between the sandwiching members 11, 12 and the outer peripheral surface of the workpiece W. Further, because, when the one end of the workpiece W is sandwiched and held by the sandwiching members 11, 12, the moving position of the lower tool rest 41 and the moving position of the upper tool rest 37 are shifted in directions away from each other in the X-axis direction by a drive force of the first feed mechanism 45 and a drive force of the second feed mechanism 48, respectively, the determination that the one end of the workpiece W is sandwiched and held by the sandwiching members 11, 12 may be made by detecting position shifts of one or both of the upper tool rest 37 and the lower tool rest 41.

Figure 11:
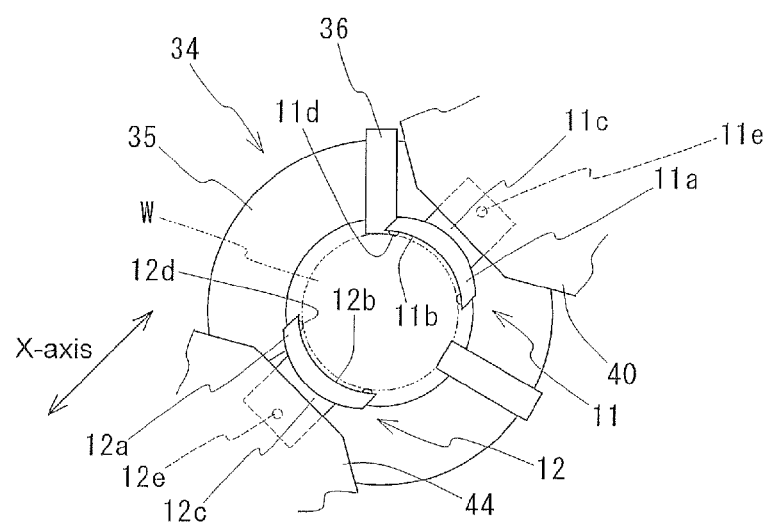
FIG. 11 is a side view showing sandwiching members and other components according to another alternative embodiment of the present invention.
Figure 12:
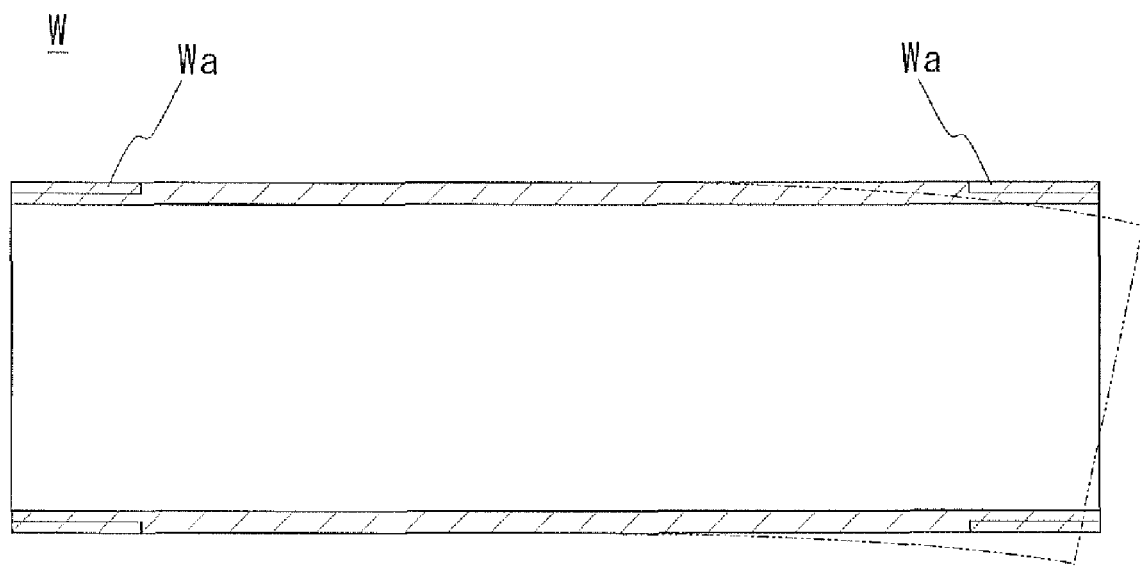
FIG. 12 is a sectional view of a workpiece for explaining a problem in the prior art.

The shape of the sandwiching members 11, 12 is not limited to the shape described above. For example, the contact portions 11a, 12a may be formed in a V-shape, or, as shown in FIG. 11, may be configured so that protrusion 11d, 12d which are respectively provided on the concave surfaces 11b, 12b contact the workpiece W. Further, the sandwiching members 11, 12 may be mounted to the turrets 40, 44 pivotably about pivot center axes 11e, 12e, respectively.

REFERENCE SIGNS LIST

1 Workpiece centering apparatus
11 Upper sandwiching member

12 Lower sandwiching member
15 Centering control section
16 Drive control section
17 Supply current detection section
30 Lathe
33 Spindle
34 Independent chuck
37 Upper tool rest
40 Turret
41 Lower tool rest
44 Turret
W Workpiece

CITATION LIST

Patent Literature

Japanese Unexamined Patent Application Publication No. 2002-59301

What is claimed is:

1. A workpiece gripping method for, in a lathe having at least a spindle and tool rests, gripping a cylindrical workpiece by means of an independent chuck attached to an end face of the spindle, the tool rests being disposed on both sides of the axis of the spindle with the axis of the spindle between them in a plane orthogonal to the axis of the spindle and being provided so that they are movable in a direction parallel to the spindle axis and in a direction orthogonal thereto, the workpiece gripping method characterized in that:
first, a sandwiching member for centering mounted to each tool rest is arranged so as to be able to face the spindle axis side;
then the tool rests are moved so that the sandwiching members and a workpiece loaded into a gripping position at which the workpiece is to be gripped by the independent chuck are brought into a positional relationship that a portion to be machined of the workpiece is positioned between the sandwiching members and the sandwiching members face each other;
subsequently, by moving the tool rests in turn or simultaneously, the sandwiching members are moved to their respective centering positions and the portion to be machined of the workpiece is sandwiched and held by the two sandwiching members, the centering position being the position of the sandwiching member when the center position of the portion to be machined of the workpiece coincides with the spindle axis in a state where the portion to be machined of the workpiece is being sandwiched and held by the two sandwiching members; and
thereafter the workpiece is gripped by the independent chuck while the portion to be machined of the workpiece remains sandwiched and held by the two sandwiching members.

2. A workpiece centering apparatus which is provided on a lathe having a spindle arranged horizontally, an independent chuck attached to an end face of the spindle for gripping a cylindrical workpiece loaded into a predetermined gripping position, tool rests being disposed on both sides of the spindle axis with the spindle axis between them in a plane orthogonal to the spindle axis and being provided so that they are movable in a direction parallel to the spindle axis and in a direction orthogonal thereto, and feed mechanisms for moving the respective tool rests, and which, when a workpiece loaded into the predetermined gripping position is gripped by the independent chuck, centers a portion to be machined of the workpiece, the workpiece centering apparatus characterized by comprising:
sandwiching members which are mounted to the respective tool rests that they are arranged so as to be able to face toward the spindle axis side and capable of contacting the outer peripheral surface of the workpiece, and which, when contacting the workpiece, position the center positions of their respective contact portions on a straight line parallel to the orthogonal direction and passing through the spindle axis; and
control means for controlling operations of the independent chuck and feed mechanisms,
the control means for moving the tool rests so that the sandwiching members and the workpiece loaded into the predetermined gripping position are brought into a positional relationship that the portion to be machined of the workpiece is positioned between the sandwiching members and the sandwiching members face each other,
then moving the tool rests in turn or simultaneously, thereby moving the sandwiching members to their respective centering positions and causing the two sandwiching members to sandwich and hold the portion to be machined of the workpiece, the centering position being the position of the sandwiching member when the center position of the portion to be machined of the workpiece coincides with the spindle axis in a state where the portion to be machined of the workpiece is being sandwiched and held by the two sandwiching members, and
thereafter, causing the independent chuck to grip the workpiece while the portion to be machined of the workpiece remains sandwiched and held by the two sandwiching members.

3. The workpiece centering apparatus according claim 2, characterized in that:
the apparatus further comprises detection means for detecting that the portion to be machined of the workpiece is sandwiched and held by the sandwiching members, and
the control means is configured to move the sandwiching members positioned the same distance away from their centering positions at the same feed rate until the detection means detects that the portion to be machined of the workpiece is sandwiched and held by the sandwiching members.

4. The workpiece centering apparatus according claim 2, characterized in that:
the apparatus further comprises detection means for detecting that the portion to be machined of the workpiece is sandwiched and held by the sandwiching members, and
the control means is coupled to the detection means,
wherein when the detection means detects that the portion to be machined of the workpiece is sandwiched and held by the sandwiching members, whether the actual positions of the sandwiching members coincide with their respective centering positions, and
when they do not coincide, calculate a position of each sandwiching member for causing the center position of the portion to be machined of the workpiece to coincide with the spindle axis on the basis of the actual positions and the centering positions, and move the sandwiching members to their respective calculated positions.

* * * * *